(12) United States Patent  
Kim et al.

(10) Patent No.: US 10,064,110 B2  
(45) Date of Patent: Aug. 28, 2018

(54) METHOD AND APPARATUS FOR HANDOVER IN WIRELESS COMMUNICATION SYSTEM

(71) Applicant: ELECTRONICS AND TELECOMMUNICATIONS RESEARCH INSTITUTE, Daejeon (KR)

(72) Inventors: Won-Ik Kim, Daejeon (KR); Seokki Kim, Daejeon (KR); Taegyun Noh, Daejeon (KR); Yu Ro Lee, Daejeon (KR); Kwang Jae Lim, Daejeon (KR); Sung Cheol Chang, Daejeon (KR); Soojung Jung, Daejeon (KR); Seungkwon Cho, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 0 days.

(21) Appl. No.: 15/343,942

(22) Filed: Nov. 4, 2016

(65) Prior Publication Data

US 2017/0135001 A1   May 11, 2017

(30) Foreign Application Priority Data

Nov. 6, 2015  (KR) .................. 10-2015-0156144  
Oct. 26, 2016  (KR) .................. 10-2016-0140407

(51) Int. Cl.  
*H04L 5/00*  (2006.01)  
*H04W 36/00*  (2009.01)  
(Continued)

(52) U.S. Cl.  
CPC ....... *H04W 36/0077* (2013.01); *H04L 5/0055* (2013.01); *H04W 74/0833* (2013.01); *H04L 69/324* (2013.01)

(58) Field of Classification Search  
CPC .......... H04W 36/0077; H04W 74/0833; H04L 5/0055; H04L 69/324  
(Continued)

(56) References Cited

U.S. PATENT DOCUMENTS 7,970,405 B2   6/2011  Baek et al.  
8,218,500 B2   7/2012  Kangude et al.  
(Continued)

FOREIGN PATENT DOCUMENTS

KR  10-2009-0111434 A  10/2009  
KR  10-2016-0058057 A  5/2016

OTHER PUBLICATIONS

You-Lin Chen et al., "A Low-Latency Scanning with Association Mechanism for Real-Time Communication in Mobile WiMAX", IEEE Transactions on Wireless Communications, vol. 11, No. 10, pp. 3550-3560, Oct. 2012.

*Primary Examiner* — Inder Mehra  
(74) *Attorney, Agent, or Firm* — Rabin & Berdo, P.C.

(57) ABSTRACT

A terminal executes a random access procedure with a target base station depending on a pre-random access channel (pre-RACH) command in a handover preparation step executed between a source base station currently accessed by the terminal and the target base station when the terminal receives the pre-RACH command from the source base station through layer2 (L2) signaling in the handover preparation step.

9 Claims, 10 Drawing Sheets

(51) Int. Cl.
*H04W 74/00* (2009.01)
*H04W 74/08* (2009.01)
*H04L 29/08* (2006.01)

(58) Field of Classification Search
USPC ............... 370/445, 446, 447, 448, 461, 462; 455/515, 438
See application file for complete search history.

(56) References Cited

U.S. PATENT DOCUMENTS

2007/0293224 A1* 12/2007 Wang ................ H04W 36/0055
455/436
2015/0181493 A1 6/2015 Park et al.
2015/0351061 A1* 12/2015 Kim ...................... H04W 56/00
370/252
2015/0373626 A1* 12/2015 Yi .......................... H04W 48/20
375/132

* cited by examiner

METHOD AND APPARATUS FOR HANDOVER IN WIRELESS COMMUNICATION SYSTEM

CROSS-REFERENCE TO RELATED APPLICATION

This application claims priority to and the benefit of Korean Patent Application Nos. 10-2015-0156144 and 10-2016-0140407 filed in the Korean Intellectual Property Office on Nov. 6, 2015 and Oct. 26, 2016, the entire contents of which are incorporated herein by reference.

BACKGROUND OF THE INVENTION (a) Field of the Invention

The present invention relates to a method and an apparatus for handover in a wireless communication system, and more particularly, to a method and an apparatus for handover capable of minimizing a data interruption time generated when a terminal executes handover in a wireless communication system.

(b) Description of the Related Art

In a wireless communication system such as the long term evolution (LTE), a procedure for handover of a terminal executing handover from a source base station to a target base station may be divided into a handover preparation step and a handover execution step.

In the handover preparation step, the source base station receives handover call acknowledgement from the target base station, and then transmits a handover command message to the corresponding terminal. In the handover execution step, the terminal is detached from the source base station, matches downlink synchronization for connecting communication with the target base station, receives system information from the target base station, and then executes a random access procedure. In addition, after the terminal completes the random access procedure with the target base station, the terminal transmits a handover confirmation message to the target base station through an uplink resource allocated from the target base station through the random access procedure, and then transmits and receives data to and from the target base station.

In this procedure for handover, a time from after the terminal is detached from the source base station until the terminal transmits the handover confirmation message to the target base station through the uplink resource allocated from the target base station is a data interruption time. That is, the data interruption time generated in the handover execution step of the terminal is mainly due to timing advance for the target base station and performance of the random access procedure for allocation of the uplink resource required for transmitting the handover completion message by the terminal.

Since the data interruption time generated at the time of performing general handover in a $3^{rd}$ generation partnership project (3GPP) LTE system is a time in which the terminal is detached from both of the source base station and the target base station, it has a negative influence on a quality of service (QoS) of the terminal that is executing an application sensitive to a delay time.

SUMMARY OF THE INVENTION

The present invention has been made in an effort to provide a method and an apparatus for handover in a wireless communication system having advantages of decreasing a data interruption time generated by a random access procedure with a target base station in a handover execution step.

An exemplary embodiment of the present invention provides a method for handover of a terminal in a wireless communication system. The method for handover includes: receiving a pre-random access channel (pre-RACH) command from a source base station through layer2 (L2) signaling in a handover preparation step executed between the source base station currently accessed by the terminal and a target base station; and executing a random access procedure with the target base station depending on the pre-RACH command in the handover preparation step.

The pre-RACH command may include cell identifiers of the target base station and a RACH configuration index indicating RACH configuration information of the target base station.

One reserved logical channel identifier of logical channel identifiers for a downlink shared channel transmitted from the source base station may be used as the pre-RACH command.

The method for handover may further include receiving system information from the source base station, wherein a plurality of RACH configuration information of a plurality of cells in the wireless communication system is mapped to a plurality of RACH configuration indices, respectively, and the system information includes mapping information between the plurality of RACH configuration information and the plurality of RACH configuration indices.

The method for handover may further include receiving system information including RACH configuration information of a plurality of cells in the wireless communication system from the source base station.

The executing of the random access procedure may include: temporarily interrupting communication with the source base station; and immediately restarting the communication with the source base station after transmitting a random access preamble corresponding to a predefined preamble index for a random access in the handover preparation step to the target base station.

The executing of the random access procedure may further include receiving a random access response message from the target base station, and the random access response message may be received through a handover command message received from the source base station in a handover execution step executed between the terminal and the target base station.

In the handover preparation step, the source base station may transmit a handover request message to the target base station, and the target base station acknowledging the handover of the terminal may transmit a handover request acknowledgement message to the source base station, the handover request message may include the predefined preamble index, and the handover request acknowledgement message may include the random access response message, and the method for handover may further include receiving the handover command message from the source base station receiving the handover request acknowledgement message, in the handover execution step.

The method for handover may further include: after the executing of the random access procedure, receiving a handover command message from the source base station; detaching connection to the source base station after continuing the communication with the source base station until before a start time of an uplink resource pre-allocated from the target base station through the random access procedure;

and transmitting a handover confirmation message to the target base station through the pre-allocated uplink resource.

Another exemplary embodiment of the present invention provides a method for handover of a terminal in a wireless communication system. The method for handover includes: receiving a handover command message including cell identifiers and preamble indices of a target base station and RACH configuration information of the target base station from a source base station when a handover preparation step executed between the source base station currently accessed by the terminal and the target base station is completed; temporarily interrupting communication with the source base station; immediately restarting the communication with the source base station after transmitting a random access preamble to the target base station on the basis of the preamble indices; and receiving a random access response message from the target base station through the source base station.

The random access response message received through the source base station may include allocation information of an uplink resource allocated by the target base station, the cell identifiers of the target base station added by the source base station, and time information indicating a detachment point in time of the communication with the source base station, and the method for handover may further include: detaching connection to the source base station on the basis of the time information; and transmitting a handover confirmation message to the target base station through the pre-allocated uplink resource.

In the handover preparation step, the source base station may transmit a handover request message to the target base station, and the target base station acknowledging the handover of the terminal may transmit a handover request acknowledgement message to the source base station, and the handover request acknowledgement message may include the cell identifiers and the preamble indices of the target base station and the RACH configuration information of the target base station.

The temporary interrupting of the communication may include interrupting the communication with the source base station in a transmission section of the random access preamble depending on the RACH configuration information of the target base station.

Yet another exemplary embodiment of the present invention provides an apparatus for handover of a terminal in a wireless communication system. The apparatus for handover includes a processor and a transceiver. The processor temporarily interrupts connection to a source base station currently accessed by the terminal, immediately restarts the communication with the source base station after transmitting a random access preamble to a target base station, detaches connection to the source base station after continuing the communication with the source base station until before a start time of an uplink resource allocated from the target base station, and informs the target base station of handover confirmation through the allocated uplink resource, for the purpose of handover to the target base station. The transceiver is connected to the processor and transmits and receives wireless signals to and from the source base station and the target base station.

The processor may transmit a random access preamble corresponding to a predefined preamble index for a random access in a handover preparation step executed between the source base station and the target base station to the target base station, depending on a pre-RACH command received from the source base station through L2 signaling in the handover preparation step, and the pre-RACH command may include cell identifiers of the target base station and a RACH configuration index indicating RACH configuration information of the target base station.

A plurality of RACH configuration information of a plurality of cells in the wireless communication system may be mapped to a plurality of RACH configuration indices, respectively, and mapping information between the plurality of RACH configuration information and the plurality of RACH configuration indices may be received from the source base station through system information.

The processor may receive a random access response message including allocation information of the uplink resource from the target base station through the transceiver, and the random access response message may be received through a handover command received from the source base station in a handover execution step executed between the terminal and the target base station.

One reserved logical channel identifier of logical channel identifiers for a downlink shared channel transmitted from the source base station may be used as the pre-RACH command.

The processor may transmit the random access preamble to the target base station and receive a random access response message, including allocation information of the uplink resource, transmitted from the target base station through the source base station, in a handover execution step between the terminal and the target base station after a handover preparation step executed between the source base station and the target base station is completed.

Cell identifiers of the target base station and time information indicating a detachment point in time of the communication with the source base station may be further included in the random access response message by the source base station, and the processor may detach the connection to the source base station on the basis of the time information, and transmit handover confirmation.

DETAILED DESCRIPTION OF THE EMBODIMENTS

Figure 1:
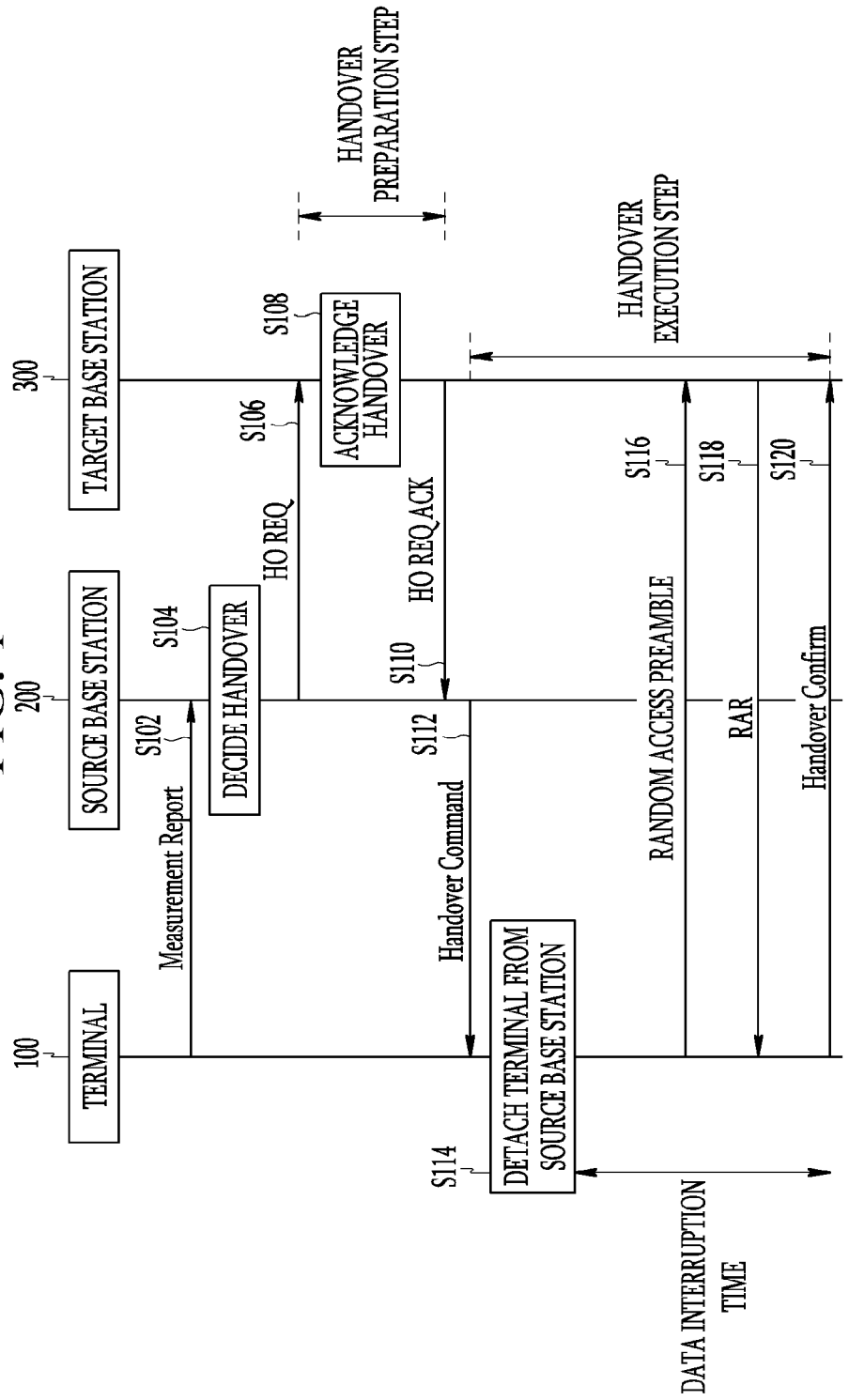
FIG. 1 is a view for describing a procedure for handover in an existing long term evolution (LTE) system.

In the following detailed description, only certain exemplary embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. Like reference numerals designate like elements throughout the specification.

Throughout the present specification and the claims, unless explicitly described to the contrary, the word "comprise" and variations such as "comprises" or "comprising", will be understood to imply the inclusion of stated elements but not the exclusion of any other elements.

Throughout the present specification, a terminal may indicate a mobile terminal (MT), a mobile station (MS), an advanced mobile station (AMS), a high reliability mobile station (HR-MS), a subscriber station (SS), a portable subscriber station (PSS), an access terminal (AT), a user equipment (UE), or the like, and may include all or some of functions of the MT, the MS, the AMS, the HR-MS, the SS, the PSS, the AT, the UE, or the like.

In addition, a base station (BS) may indicate an advanced base station (ABS), a high reliability base station (HR-BS), a node B, an evolved node B, (eNodeB), an access point (AP), a radio access station (RAS), a base transceiver station (BTS), a mobile multihop relay (MMR)-BS, a relay station (RS) serving as the base station, a relay node (RN) serving as the base station, an advanced relay station (ARS) serving as the base station, a high reliability relay station (HR-RS) serving as the base station, small base stations [femto base station (femto BS), a home node B (HNB), a home eNodeB (HeNB), a pico base station (pico BS), a metro base station (metro BS), a micro base station (micro BS), and the like], or the like, and may include all or some of functions of the ABS, the node B, the eNodeB, the AP, the RAS, the BTS, the MMR-BS, the RS, the RN, the ARS, the HR-RS, the small base stations, or the like.

Next, a method and an apparatus for handover in a wireless communication system according to an exemplary embodiment of the present invention will be described in detail with reference to the accompanying drawings.

FIG. 1 is a view for describing a procedure for handover in an existing long term evolution (LTE) system.

Referring to FIG. 1, a terminal 100 transmits adjacent cell measurement report messages to a source base station 200 (S102). The adjacent cell measurement report messages include measurement values of adjacent cells measured by the terminal.

The source base station 200 decides handover of the terminal on the basis of the measurement values of the adjacent cells measured by the terminal (S104).

In the case in which the source base station 200 decides the handover of the terminal, the source base station 200 executes a handover preparation step. In the handover preparation step, the source base station transmits a handover request (HO REQ) message to a target base station 300 (S106). The target base station 300 acknowledges the handover of the terminal 100 (S108), and transmits a handover request acknowledgement (HO-REQ ACK) message to the source base station 200 (S110). When the source base station 200 receives the handover request acknowledgement (HO-REQ ACK) message from the target base station 300, the source base station 200 transmits a handover command message to the terminal 100 (S112).

When the handover preparation step is completed as described above, a handover execution step is executed.

In the handover execution step, the terminal 100 is disconnected from the source base station 200, and is detached from the source base station 200 (S114). Then, the terminal 100 matches downlink synchronization for connecting communication with the target base station 300, receives system information from the target base station 300, and then executes a random access procedure. For the purpose of the random access procedure, the terminal 100 transmits a random access preamble to the target base station 300 (S116). The target base station 300 transmits a random access response (RAR) message to the terminal 100 (S118). The RAR message may include timing advance (TA) information through which the terminal 100 matches uplink synchronization, uplink resource allocation information through which the terminal 100 may transmit a handover confirmation message, and the like. The terminal 100 executes the uplink synchronization on the basis of the received RAR message, and completes the random access procedure with the target base station 300. Then, the terminal 100 transmits the handover confirmation message to the target base station 300 through an uplink resource allocated from the target base station 300 (S120), and transmits and receives data to and from the target base station 300.

In this procedure for handover, a data interruption time is generated from after the terminal 100 is detached from the source base station 200 until the terminal 100 transmits the handover confirmation message to the target base station 300 through the uplink resource allocated from the target base station 300. The data interruption time has a negative influence on a quality of service (QoS) of an application sensitive to a delay time. In an exemplary embodiment of the present invention, a method for handover capable of minimizing the data interruption time is suggested.

Figure 2:
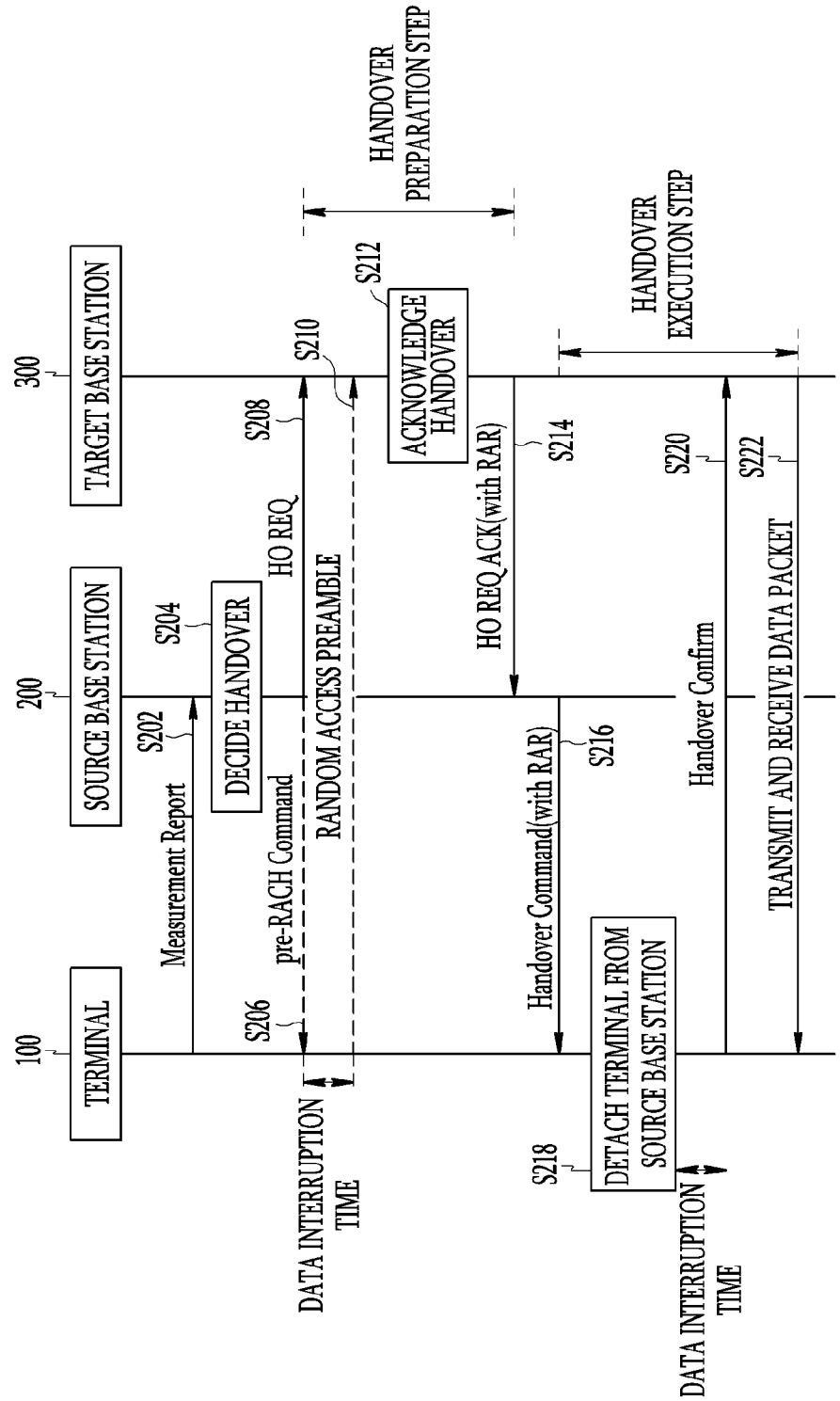
FIG. 2 is a view for describing a method for handover according to a first exemplary embodiment of the present invention.

FIG. 2 is a view for describing a method for handover according to a first exemplary embodiment of the present invention.

Referring to FIG. 2, a terminal 100 transmits adjacent cell measurement report messages to a source base station 200 (S202). The adjacent cell measurement report messages include measurement values of adjacent cells measured by the terminal. In addition, cell identifications physCellIds of the adjacent cells measured by the terminal are sequentially arranged and included in information elements of the adjacent cell measurement report messages.

The source base station 200 executes handover decision of the terminal 100 on the basis of measurement values of the adjacent cells in the adjacent cell measurement report messages (S204).

In the case in which the source base station 200 decides handover of the terminal 100, the source base station 200 transmits a pre-random access channel (RACH) command commanding the terminal 100 to transmit a random access preamble to the target base station 300 to the terminal 100 (S206). In addition, the source base station 200 transmits a handover request (HO REQ) message to the target base station 300 (S208). The handover request (HO REQ) message may include preamble indices for pre-random access-based rapid handover. The source base station 200 selects one of the preamble indices for pre-random access-based rapid handover, and transmits the selected preamble index to the terminal 100 through a system information block or radio resource control (RRC) signaling in advance. In addition, when the source base station 200 decides the handover of the terminal 100 in step (S204), the source base station 200 may transmit the preamble indices for pre-random access-based rapid handover allocated to the terminal 100 to the target base station 300 through the handover request (HO REQ) message.

According to an exemplary embodiment of the present invention, a pre-random access medium access control (MAC) control element (CE), which is a layer2 (L2) signaling message, is used as the pre-RACH command.

Figure 3:
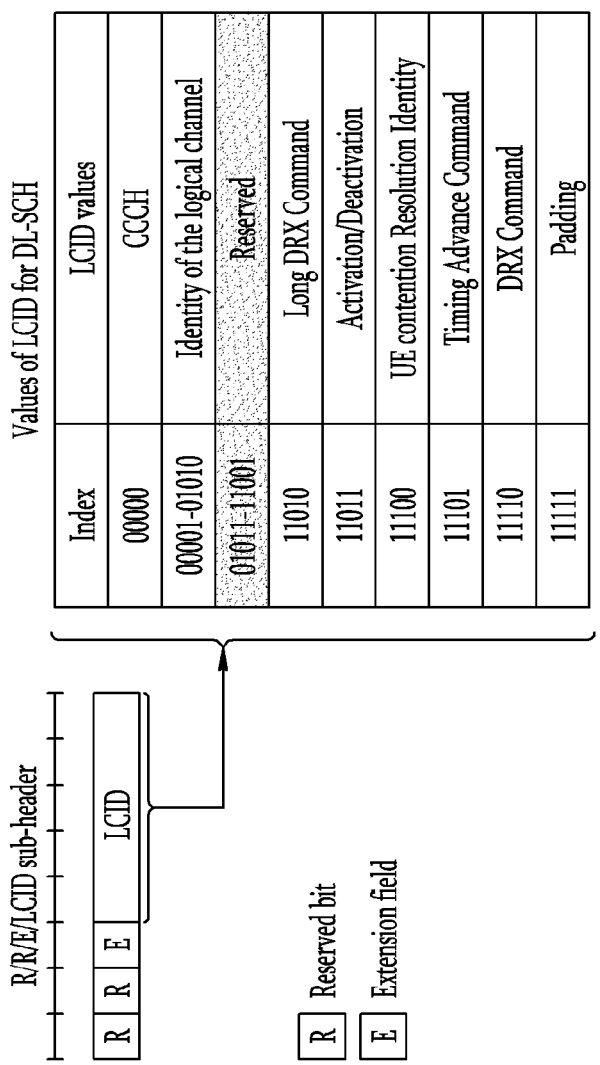
FIG. 3 is a view showing a downlink shared channel (DL-SCH) header and a logical channel identifier (LCID) index defined in an existing $3^{rd}$ generation partnership project (3GPP) specification.
Figure 4:
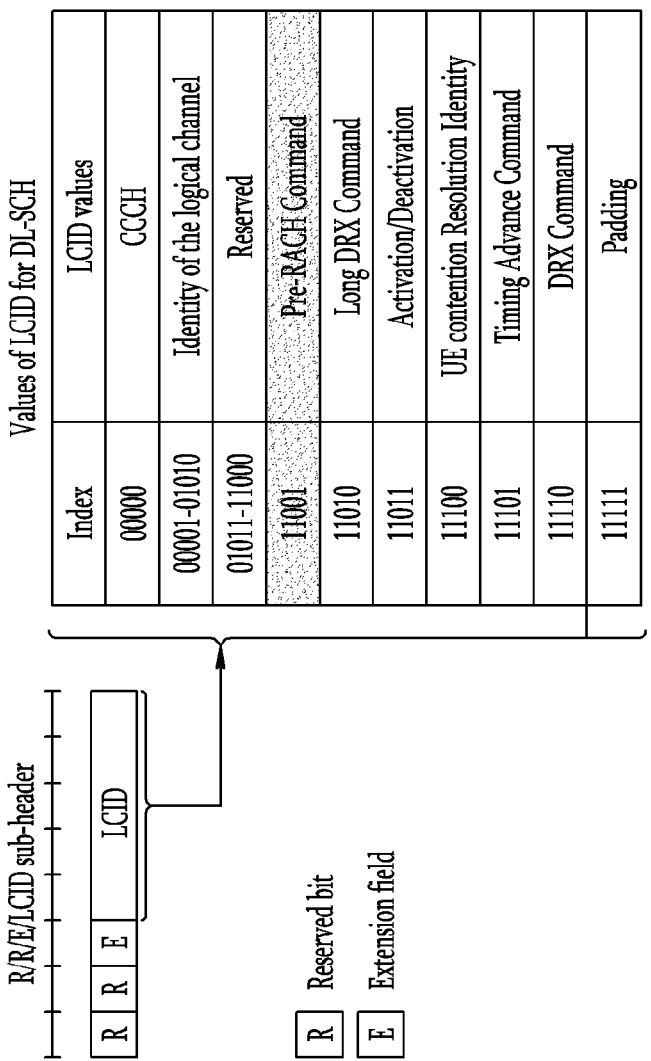
FIG. 4 is a view showing an example of a pre-random access channel (RACH) command according to an exemplary embodiment of the present invention.
Figure 5:
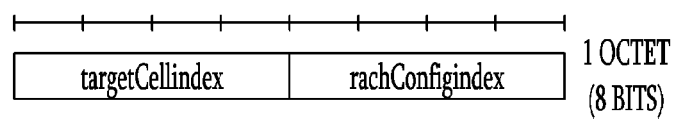
FIG. 5 is a view showing an example of an MAC CE of the pre-RACH command according to an exemplary embodiment of the present invention.

FIG. 3 is a view showing a downlink shared channel (DL-SCH) header and a logical channel identifier (LCID) index defined in an existing $3^{rd}$ generation partnership project (3GPP) specification, and FIG. 4 is a view showing an example of a pre-RACH command according to an exemplary embodiment of the present invention. FIG. 5 is a view showing an example of an MAC CE of the pre-RACH command according to an exemplary embodiment of the present invention.

Referring to FIGS. 3 and 4, one of logical channel identifiers (LCIDs) including five bits for a DL-SCH transmitted from the source base station 200 is used as the pre-RACH command, which is a L2 signaling.

Referring to FIG. 3, an R/R/E/LCID sub-header includes four fields corresponding to R, R, E, and LCID. R, which is a reserved bit, is set to 0. In addition, E, which is an extension field, includes a flag bit indicating whether or not an additional field is present in an MAC header. In the case in which E is set to 1, it indicates that another R/R/E/LCID sub-header is present. LCID, which is a logical channel identifier field, indicates whether or not a corresponding logical channel or MAC CE is present. For example, in the case in which the LCID is set to 11011, it indicates that an MAC CE for indicating activation/deactivation is present.

Referring to FIG. 3, in a current 3GPP specification TS 36.321 V12.5.0, twenty four reserved LCIDs for a DL-SCH are present. One of the twenty four reserved LCIDs for a DL-SCH is used as the pre-RACH command. For example, as shown in FIG. 4, an LCID "11001" may be used as the MAC CE for the pre-RACH command.

Referring to FIG. 5, the MAC CE of the pre-RACH command includes one octet (8 bits) including a 4-bit target cell index targetCellIndex and a 4-bit RACH configuration index rachConfigIndex. The sequentially arranged cell identifications physCellIds of the adjacent cells included in a final adjacent cell measurement report message of the adjacent cell measurement report messages transmitted from the terminal 100 to the source base station 200 are mapped to the target cell index targetCellIndex. For example, a cell identification physCellId of a first adjacent cell is mapped to "0000" of the target cell index targetCellIndex, and a cell identification physCellId of a second adjacent cell is mapped to "0001" of the target cell index targetCellIndex. In this case, "1111" of the target cell index targetCellIndex is used for the source base station 200 to command the terminal 100 to receive a system information block from the target base station 300 and transmit the random access preamble to the target base station 300 when the source base station 200 does not know RACH configuration information of the corresponding adjacent cell. The RACH, which is a transmission channel, is mapped to a physical random access channel (PRACH), which is a physical channel. The RACH configuration information may mean PRACH configuration information.

Since values mainly used as RACH configuration parameter values of base stations actually built in the same operator/system are determined, RACH configuration information of cells set by base stations adjacent to each other consists of kinds within a predetermined number (for example, 15), and RACH configuration information of the adjacent cells is mapped to a 4-bit RACH configuration index rachConfigIndex. In this case, the terminal 100 may know the RACH configuration information within the predetermined number (for example, 15) in advance or may allow the RACH configuration information within the predetermined number (for example, 15) to be included in a system information block broadcast by the source base station 200 and may know the RACH configuration information of the adjacent cells through the system information block broadcast by the source base station 200.

The pre-RACH command is an indicator commanding the corresponding terminal 100 to execute a pre-random access, and a point in time in which the source base station 200 transmits the pre-RACH command to the corresponding terminal 100 is determined in consideration of an L2 signaling transmission time and a processing time of the terminal on the basis of RACH transmission section information [RACH slot] of the RACH configuration information of the target base station 300.

The terminal 100 receiving the pre-RACH command may confirm a cell identification targetPhysCellId of the target base station through the target cell index targetCellIndex of the MAC CE of the pre-RACH command, and obtain the RACH transmission section information of the target base station 300 through the RACH configuration index rachConfigIndex.

The terminal 100 receiving the pre-RACH command temporarily interrupts communication with the source base station 200, receives primary synchronization signals (PSSs) and secondary synchronization signals (SSSs) from the target base station 300, and then transmits the random access preamble to the target base station 300 using a predefined preamble index for pre-random access-based rapid handover (S210). The random access preamble is transmitted through L2 signaling. That is, steps S206 and S210 of FIG. 2 may be performed through the L2 signaling, and the remaining steps of FIG. 2 may be performed through layer3 (L3) signaling.

The terminal 100 transmitting the random access preamble to the target base station 300 immediately restarts communication with the source base station 200. Generally, as described in FIG. 1, the terminal 100 receives an RAR message from the target base station 300, after transmitting the random access preamble. According to an exemplary embodiment of the present invention, the terminal 100 restarts the communication with the source base station 200 without receiving the RAR message, after transmitting the random access preamble.

The target base station 300 receiving the random access preamble from the terminal 100 acknowledges the handover of the terminal 100 (S212), and transmits a handover request acknowledgement (HO-REQ ACK) message to the source base station 200 through an X2 interface (S214). In this case, the RAR message may be included in the handover request acknowledgement (HO-REQ ACK) message. That is, TA information obtained by calculating uplink timing advance of the corresponding terminal 100 by the target base station 300 is included in the handover request acknowledgement (HO-REQ ACK) message, and unlink resource information pre-allocated for transmission of a handover confirmation message by the corresponding terminal 100 and a new cell radio network temporary identifier (C-RNTI) may be included in the handover request acknowledgement (HO-REQ ACK) message.

The source base station 200 receiving the handover request acknowledgement (HO-REQ ACK) message from the target base station 300 allows the RAR message to be included in a handover command message and transmits the handover command message including the RAR message to the terminal 100 (S216). That is, TA information, the information on the pre-allocated uplink resource, and the C-RNTI may be included in the handover command message.

The terminal 100 receiving the handover command message from the source base station 200 continues communication with the source base station 200 until a start time of the uplink resource pre-allocated from the target base station 300, and then detaches connection to the source base station 200 in an appropriate time in consideration of the start time of the pre-allocated uplink resource, such that the terminal 100 is detached from the source base station 200 (S218).

Then, the terminal 100 receives the PSSs and the SSSs from the target base station 300, and transmits the handover confirmation message to the target base station 300 through the pre-allocated uplink resource (S220). In this case, the terminal 100 may receive data from the target base station 300 simultaneously with transmitting the handover confirmation message to the target base station 300.

The target base station 300 receiving the handover confirmation message transmits and receives uplink and downlink data packets to and from the corresponding terminal 100 (S222).

As described above, according to the procedure for handover according to an exemplary embodiment of the present invention, the terminal 100 may know the RACH configuration information of the target base station 300 in advance even though it does not receive the system information block from the target base station 300. In addition, in the handover preparation step, the source base station 200 commands the terminal 100 to execute a random access to the target base station through the L2 signaling, such that a random access procedure for handover of the terminal is executed in the handover preparation step. In this case, the terminal 100 transmitting the random access preamble to the target base station 300 immediately restarts the communication with the source base station 200 without receiving the RAR message from the target base station 300, thereby making it possible to decrease a data interruption time.

When the target base station 300 does not acknowledge the handover of the terminal 100 in step (S214) of transmitting the handover request acknowledgement (HO-REQ ACK) message to the source base station 200 or the target base station 300 does not permit pre-uplink synchronization through the pre-random access procedure, the target base station 300 transmits the handover request acknowledgement (HO-REQ ACK) message to the source base station 200 in a state in which this fact is expressed in the handover request acknowledgement (HO-REQ ACK) message, and the source base station 200 also transmits the handover command message to the corresponding terminal 100 in a state in which this fact is expressed in the handover command message. In this case, the terminal 100 executes the handover through the existing procedure for handover described in FIG. 1 rather than the procedure for handover according to an exemplary embodiment of the present invention.

Figure 6:
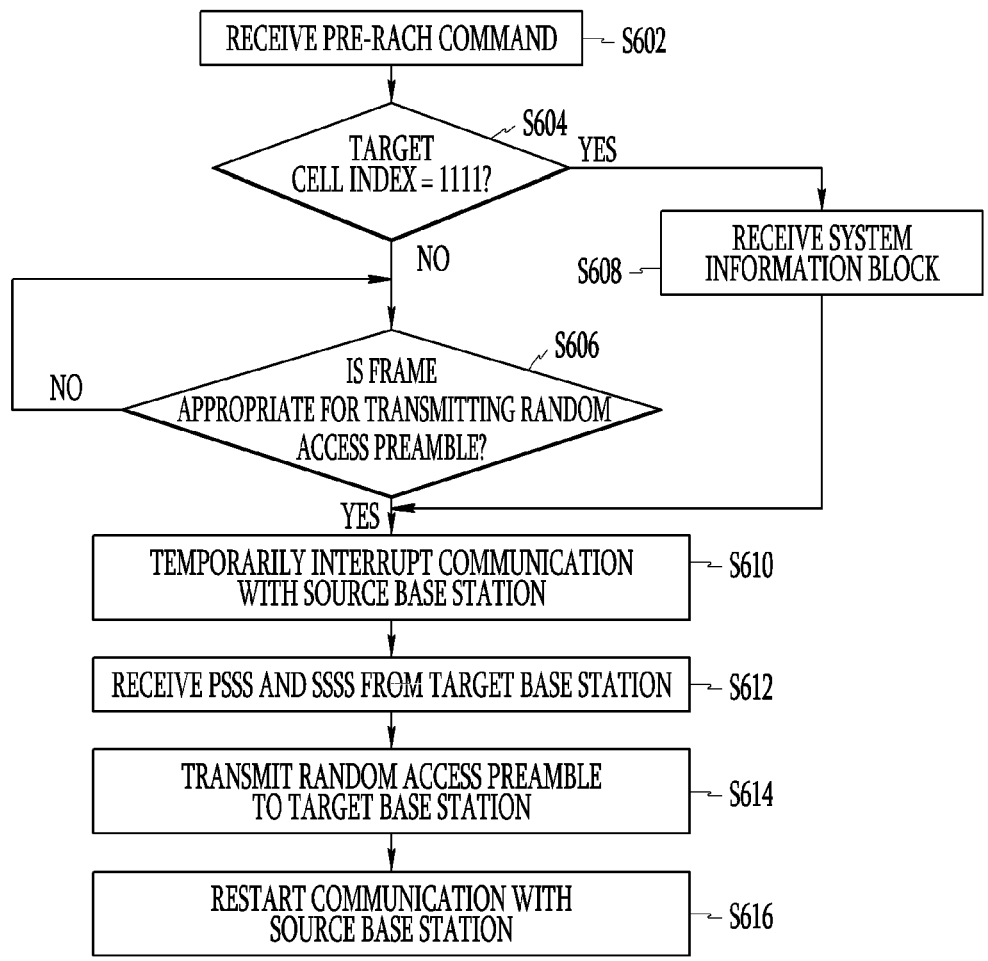
FIG. 6 is a flow chart showing an operation of a terminal in a handover preparation step described in FIG. 2.

FIG. 6 is a flow chart showing an operation of a terminal in a handover preparation step described in FIG. 2.

Referring to FIG. 6, when the terminal 100 receives the pre-RACH command from the source base station 200 (S602), the terminal 100 obtains the target cell index targetCellIndex and the RACH configuration index rachConfigIndex from the pre-RACH command.

When the target cell index targetCellIndex is one of values from 0000 to 1110, the terminal 100 waits until a frame becomes an appropriate frame in which a random access preamble depending on a PRACH resource configuration of the target base station 300 is to be transmitted.

When the frame becomes the appropriate frame in which the random access preamble depending on the PRACH resource configuration of the target base station 300 is to be transmitted (S606), the terminal 100 temporarily interrupts the communication with the source base station 200 (S610), receives the PSSs and the SSSs of the target base station 300 to match synchronization with the target base station 300 (S612), and transmits the random access preamble to the target base station 300 using the predefined preamble index for pre-random access-based rapid handover (S614). Here, the appropriate frame in which the random access preamble is to be transmitted may be determined in consideration of the processing time of the terminal 100 before a start point in time of a transmission section of the random access preamble depending on the PRACH resource configuration.

The terminal 100 immediately restarts the communication with the source base station 200 (S616) after transmitting the random access preamble.

Meanwhile, when the target cell index targetCellIndex is 1111 (S604), the terminal 100 receives the system information block from the target base station 300 (S608). As described above, a case in which the target cell index targetCellIndex is 1111 is used when the source base station 200 does not know the RACH configuration information of the target base station. Therefore, the terminal 100 additionally executes a process of receiving the system information block from the target base station 300, thereby obtaining the RACH configuration information of the target base station 300. Then, the terminal 100 temporarily interrupts the communication with the source base station 200 (S610), receives the PSSs and the SSSs of the target base station 300 to match the synchronization with the target base station 300 (S612), and transmits the random access preamble to the target base station 300 using the predefined preamble index for pre-random access-based rapid handover (S614). Then, the terminal 100 immediately restarts the communication with the source base station 200 (S616).

Figure 7:
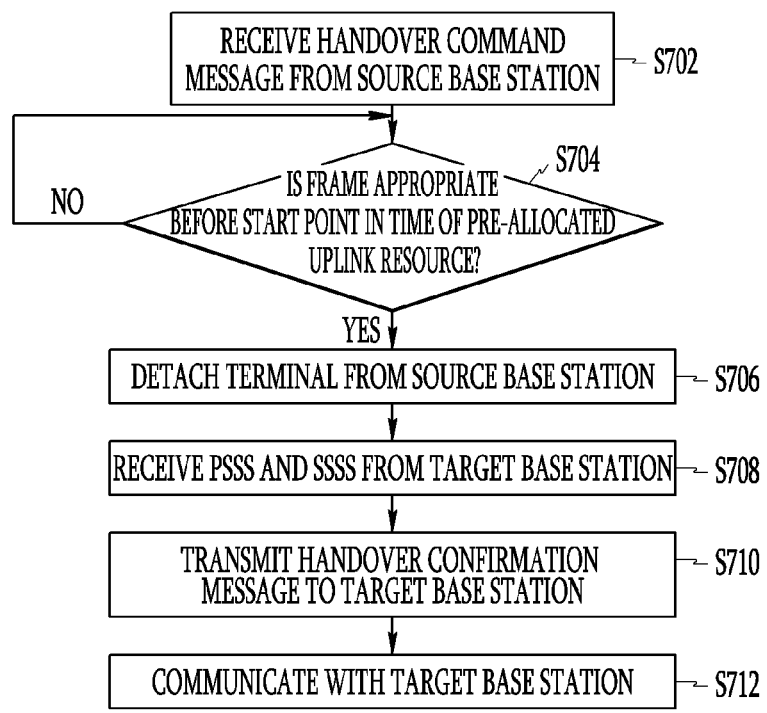
FIG. 7 is a flow chart showing an operation of a terminal in a handover execution step described in FIG. 2.

FIG. 7 is a flow chart showing an operation of a terminal in a handover execution step described in FIG. 2.

Referring to FIG. 7, when the terminal 100 receives the handover command message from the source base station 200 (S702), the terminal 100 waits until a frame becomes an appropriate frame in consideration of a processing time of the terminal, before a start point in time of a pre-allocated uplink resource.

When the frame becomes the appropriate frame before the start point in time of the pre-allocated uplink resource (S704), the terminal 100 disconnects the communication with the source base station 200 and is detached from the source base station 200 (S706).

Then, the terminal 100 receives the PSSs and the SSSs from the target base station 300 to execute the synchronization with the target base station 300 (S708).

Then, the terminal 100 transmits the handover confirmation message to the target base station 300 through the uplink resource pre-allocated by the target base station 300 (S710).

The terminal 100 restarts the communication with the target base station 300 (S712).

Through the procedure described above, in the handover execution step, the terminal 100 does not execute a random access procedure to the target base station 300 after it is detached from the source base station 200, such that a data interruption time in the handover execution step may be decreased. In addition, also in the handover preparation step, the terminal 100 transmits only the random access preamble and again restarts the communication with the source base station 200, thereby making it possible to decrease an entire data interruption time due to the handover.

Figure 8:
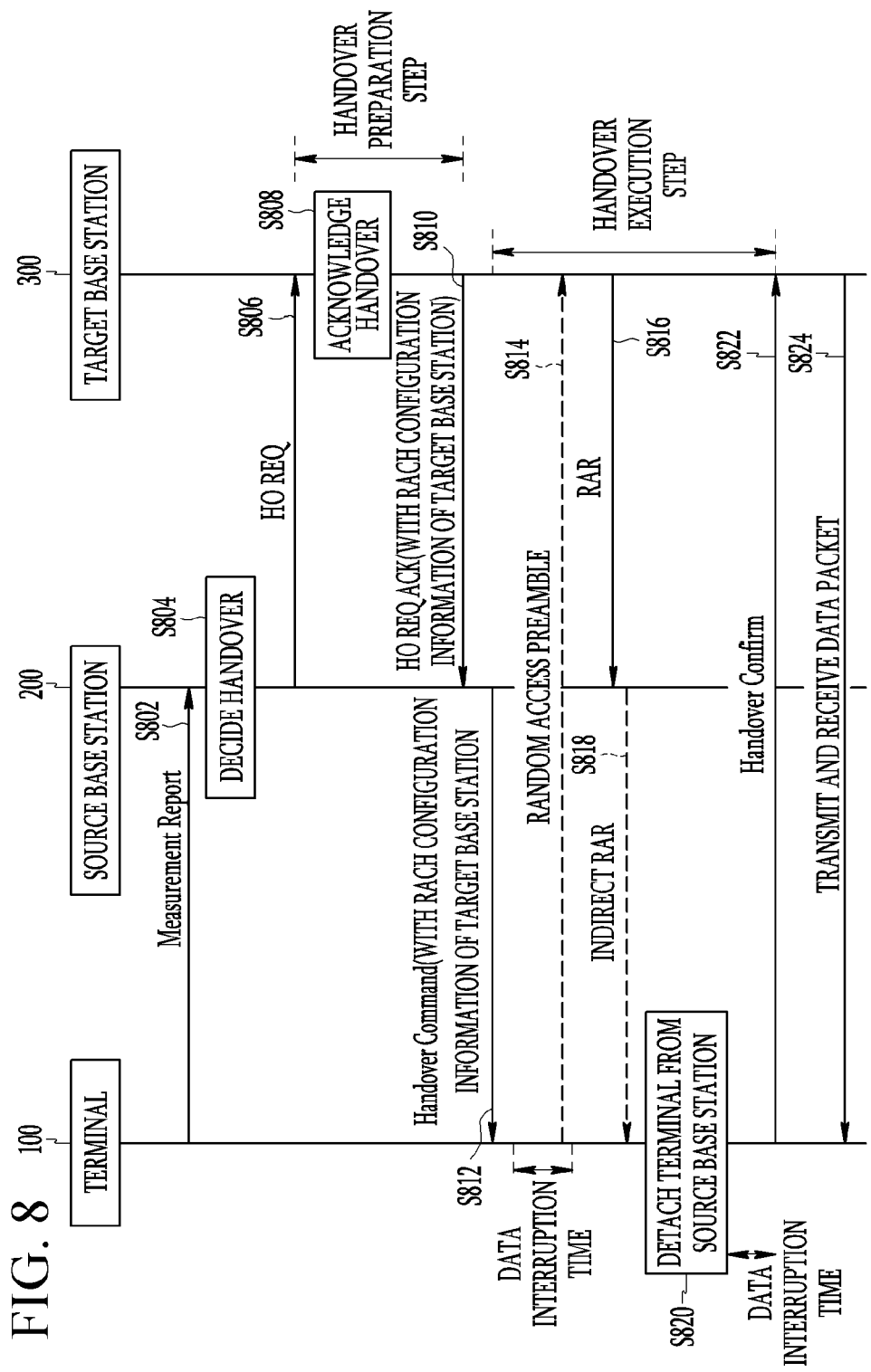
FIG. 8 is a view for describing a method for handover according to a second exemplary embodiment of the present invention.

FIG. 8 is a view for describing a method for handover according to a second exemplary embodiment of the present invention.

Referring to FIG. 8, steps (S802 to S810), that is, steps from after the source base station 200 decides the handover of the terminal 100 until the handover preparation step are similar to those described in FIG. 1. Meanwhile, in the case in which the target base station 300 acknowledges handover of the terminal 100 (S808), the target base station 300 transmits a handover request acknowledgement (HO-REQ ACK) message to the source base station 200 (S810). However, in this case, the target base station 300 transmits the handover request acknowledgement (HO-REQ ACK) message in which a preamble index for a contention-free random access, RACH configuration information, which is system information of the target base station 300, and the like, are included, unlike FIG. 1.

The source base station 200 receiving the handover request acknowledgement (HO-REQ ACK) message from the target base station 300 transmits a handover command message to the terminal 100 (S812). The handover command message may include a target cell identification targetPhysCellId, a preamble index, RACH configuration information, which is system information of the target base station, and the like.

The terminal 100 receiving the handover command message temporarily interrupts communication with the source base station 200, and receives PSSs and SSSs from the target base station 300 to execute synchronization with the target base station 300.

Then, the terminal 100 transmits a random access preamble to the target base station through L2 signaling on the basis of the preamble index (S814).

The terminal 100 immediately restarts the communication with the source base station 200 after transmitting the random access preamble.

The target base station 300 receiving the random access preamble from the terminal 100 decodes the random access preamble, calculates TA information for unlink synchronization, and allocates an uplink resource so that the terminal 100 may transmit a handover confirmation message.

The target base station 300 transmits an RAR message including the TA information, uplink resource allocation information, and a C-RNTI to the source base station 200 through the X2 interface (S816), thereby requesting the source base station 200 to forward the RAR message to the terminal 100.

The source base station 200 receiving the RAR message from the target base station 300 transmits an indirect-RAR (I-RAR) message formed by adding the target cell identification targetPhysCellId and time information indicating a detachment point in time of the communication with the source base station 200 to information included in the corresponding RAR message to the corresponding terminal 100 through the L2 signaling (S818). Steps S812 and S818 of FIG. 8 may be performed through the L2 signaling, and the remaining steps of FIG. 8 may be performed through L3 signaling. In this case, a value of the time information indicating the detachment point in time of the communication between the corresponding terminal 100 and the source base station 200 is set in consideration of a processing delay time and the uplink resource allocation information of the corresponding terminal 100 in the source base station 200.

The terminal 100 receiving the I-RAR message from the source base station 200 detaches the communication with the source base station 200 in a subframe corresponding to the time information on the detachment point in time of the communication with the source base station 200, such that the terminal 100 is detached from the source base station 200 (S820).

Then, the terminal 100 receives the PSSs and the SSSs from the target base station 300 to match the synchronization with the target base station 300, and transmits the handover confirmation message to the target base station 300 through the pre-allocated uplink resource (S822). In this case, the terminal 100 may receive data from the target base station 300 simultaneously with transmitting the handover confirmation message to the target base station 300.

The target base station 300 receiving the handover confirmation message transmits and receives uplink and downlink data packets to and from the corresponding terminal 100 (S824).

The procedure for handover described in FIG. 8 is different from the existing procedure for handover in that some of the system information such as the RACH configuration information of the target base station 300, or the like, is included in the handover command message transmitted from the source base station 200 to the terminal 100. Therefore, the terminal 100 does not need to receive the system information broadcast by the target base station 300 at the time of executing the handover to the target base station 300, such that a data interruption time due to the reception of the system information broadcast by the target base station 300 may be decreased. In addition, the procedure for handover described in FIG. 8 is different from the existing procedure for handover in that the target base station 300 does not directly transmit the RAR message to the terminal 100, but transmit the RAR message to the source base station 200 through the X2 interface and the source base station 200 forwards the RAR message to the terminal 100, when the terminal 100 executes a random access to the target base station 300 in the handover execution step. Therefore, the terminal 100 may immediately restart the communication with the source base station 200 after transmitting the random access preamble without continuously interrupting the connection to the source base station 200 in order to receive the RAR message from the target base station 300, such that the data interruption time due to the handover may be decreased.

Figure 9:
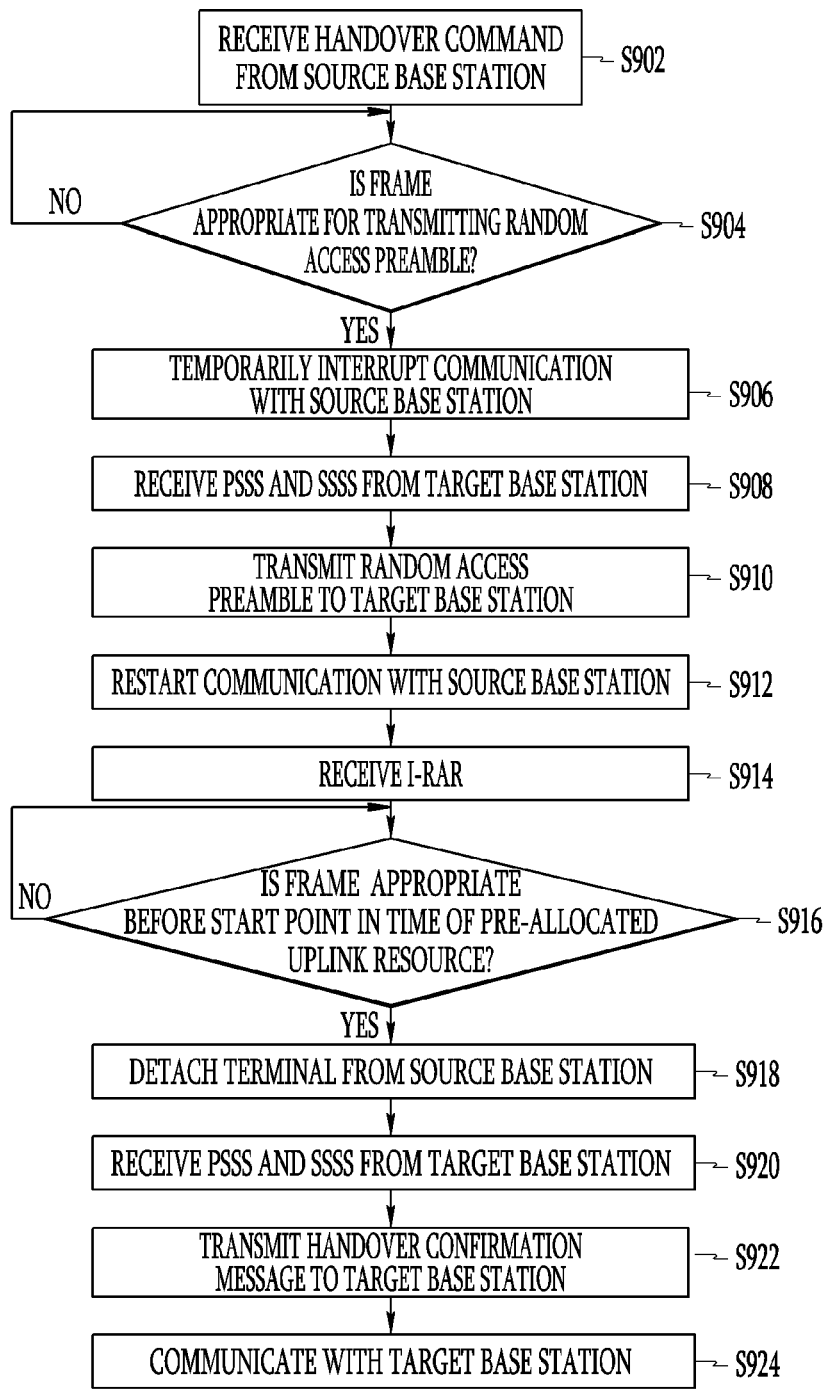
FIG. 9 is a flow chart showing an operation of a terminal in a handover execution step described in FIG. 8.

FIG. 9 is a flow chart showing an operation of a terminal in a handover execution step described in FIG. 8.

Referring to FIG. 9, when the terminal 100 receives the handover command from the source base station 200 (S902), the terminal 100 waits until a frame becomes an appropriate frame in which the random access preamble depending on the PRACH resource configuration of the target base station 300 is to be transmitted.

When the frame becomes the appropriate frame in which the random access preamble depending on the PRACH resource configuration of the target base station 300 is to be transmitted (S904), the terminal 100 temporarily interrupts the communication with the source base station 200 (S906), receives the PSSs and the SSSs of the target base station 300 to match synchronization with the target base station 300 (S908), and transmits the random access preamble to the target base station 300 using the preamble index included in the handover command (S910).

The terminal 100 immediately restarts the communication with the source base station 200 (S912) after transmitting the random access preamble.

When the terminal 100 receives the I-RAR message from the source base station 200 (S914), the terminal 100 waits until a frame becomes an appropriate frame in consideration of a processing time of the terminal, before a start point in time of pre-allocated uplink resource.

When the frame becomes the appropriate frame before the start point in time of the pre-allocated uplink resource (S916), the terminal 100 disconnects the communication with the source base station 200 and is detached from the source base station 200 (S918).

Then, the terminal 100 receives the PSSs and the SSSs from the target base station 300 to execute the synchronization with the target base station 300 (S920).

Then, the terminal 100 transmits the handover confirmation message to the target base station 300 through the uplink resource pre-allocated by the target base station 300 (S922).

The terminal 100 restarts the communication with the target base station 300 (S924).

Through the procedure described above, the random access procedure is executed in the handover execution step, but a time required for the terminal 100 to receive the system information of the target base station 300, a time required for the terminal 100 to wait for a RACH transmission section of the target base station 300, and a time required for the terminal 100 to wait in order to receive the RAR message from the target base station 300 that are generated in the existing random access procedure are removed, thereby making it possible to decrease the data interruption time in the handover execution step.

Figure 10:
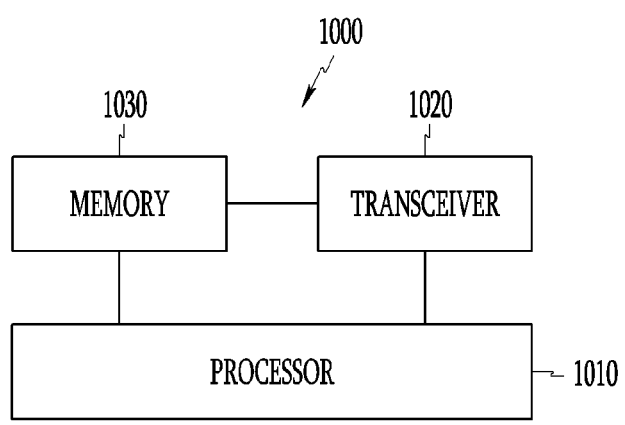
FIG. 10 is a view showing an apparatus for handover of a terminal according to an exemplary embodiment of the present invention.

FIG. 10 is a view showing an apparatus for handover of a terminal according to an exemplary embodiment of the present invention.

Referring to FIG. 10, the apparatus 1000 for handover of a terminal 100 includes a processor 1010, a transceiver 1020, and a memory 1030.

The processor 1010 may be operated to implement the procedures, methods, and functions for handover of the terminal 100 described with reference to FIGS. 2 to 9.

The transceiver 1020 is connected to the processor 1010, and transmits and receives wireless signals.

The memory 1030 stores instructions that are to be executed in the processor 1010 therein or loads and temporally stores instructions from a storage (not shown) therein. The processor 1010 may execute the instructions stored or loaded in the memory 1030. In addition, the memory 1030 may store information related to operations of the processor 1010 therein.

The processor 1010 and the memory 1030 are connected to each other through a bus (not shown), and input and output interfaces (not shown) may also be connected to the bus. In this case, the transceiver 1020 may be connected to the input and output interfaces, and peripheral devices such as an input device, a display, a speaker, a storage device, and the like, may be connected to the input and output interfaces.

According to an exemplary embodiment of the present invention, the data interruption time in the handover execution step may be decreased, and a data interruption time generated by executing the random access in the handover preparation step may also be significantly decreased as compared with the related art.

The exemplary embodiments of the present invention described above are not implemented through only the apparatus and/or the method described above, but may also be implemented through programs executing functions corresponding to configurations of the exemplary embodiments of the present invention, a recording medium in which the programs are recorded, and the like. In addition, these implementations may be easily made by those skilled in the art to which the present invention pertains from the exemplary embodiments described above.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A method for handover of a terminal in a wireless communication system, comprising:
   receiving, by the terminal, a pre-random access channel (pre-RACH) command from a source base station through layer2 (L2) signaling in a handover preparation step executed between the source base station currently accessed by the terminal and a target base station, wherein the handover preparation step is before receiving a handover command message from the source base station; and
   executing a random access procedure with the target base station depending on the pre-RACH command in the handover preparation step.

2. A method for handover of a terminal in a wireless communication system, comprising:
   receiving, by the terminal, a pre-random access channel (pre-RACH) command from a source base station through layer2 (L2) signaling in a handover preparation step executed between the source base station currently accessed by the terminal and a target base station; and
   executing a random access procedure with the target base station depending on the pre-RACH command in the handover preparation step, wherein:
   the pre-RACH command includes cell identifiers of the target base station and a RACH configuration index indicating RACH configuration information of the target base station.

3. The method for handover of claim 2, wherein:
   one reserved logical channel identifier of logical channel identifiers for a downlink shared channel transmitted from the source base station is used as the pre-RACH command.

4. The method for handover of claim 2, further comprising:
   receiving system information from the source base station,
   wherein RACH configuration information of a plurality of cells in the wireless communication system is mapped to a plurality of RACH configuration indices, respectively, and
   the system information includes mapping information between the RACH configuration information and the plurality of RACH configuration indices.

5. The method for handover of claim 2, further comprising:
   receiving system information including RACH configuration information of a plurality of cells in the wireless communication system from the source base station.

6. The method for handover of claim 2, wherein:
   the executing of the random access procedure includes:
   temporarily interrupting communication with the source base station; and immediately restarting the communication with the source base station after transmitting a random access preamble corresponding to a predefined preamble index for a random access in the handover preparation step to the target base station.

7. The method for handover of claim 6, wherein:
the executing of the random access procedure further includes receiving a random access response message from the target base station, and
the random access response message is received through a handover command message received from the source base station in a handover execution step executed between the terminal and the target base station.

8. The method for handover of claim 7, wherein:
in the handover preparation step, the source base station transmits a handover request message to the target base station, and the target base station acknowledging the handover of the terminal transmits a handover request acknowledgement message to the source base station, and the handover request message includes the predefined preamble index, and the handover request acknowledgement message includes the random access response message, and
the method for handover further comprises receiving the handover command message from the source base station receiving the handover request acknowledgement message, in the handover execution step.

9. The method for handover of claim 6, further comprising:
after the executing of the random access procedure, receiving a handover command message from the source base station;
detaching connection to the source base station after continuing the communication with the source base station until before a start time of an uplink resource pre-allocated from the target base station through the random access procedure; and
transmitting a handover confirmation message to the target base station through the pre-allocated uplink resource.

* * * * *